(12) United States Patent
Uzeda Garcia et al.

(10) Patent No.: US 12,101,775 B2
(45) Date of Patent: Sep. 24, 2024

(54) OPTIMIZING RESOURCE OF A TERMINAL ALLOCATION BY COMPUTER VISION

(71) Applicant: Nokia Technologies Oy, Espoo (FI)

(72) Inventors: Luis Guilherme Uzeda Garcia, Massy (FR); Mikko Saily, Laukkoski (FI); Wolfgang Zirwas, Munich (DE); Dalia-Georgiana Popescu, Paris (FR)

(73) Assignee: NOKIA TECHNOLOGIES OY, Espoo (FI)

( * ) Notice: Subject to any disclaimer, the term of this patent is extended or adjusted under 35 U.S.C. 154(b) by 352 days.

(21) Appl. No.: 17/638,006

(22) PCT Filed: Aug. 28, 2019

(86) PCT No.: PCT/EP2019/073002
§ 371 (c)(1),
(2) Date: Feb. 24, 2022

(87) PCT Pub. No.: WO2021/037359
PCT Pub. Date: Mar. 4, 2021

(65) Prior Publication Data
US 2022/0279560 A1 Sep. 1, 2022

(51) Int. Cl.
*H04W 72/21* (2023.01)
*H04W 4/029* (2018.01)
*H04W 36/00* (2009.01)

(52) U.S. Cl.
CPC ........... *H04W 72/21* (2023.01); *H04W 4/029* (2018.02); *H04W 36/0069* (2018.08)

(58) Field of Classification Search
None
See application file for complete search history.

(56) References Cited

U.S. PATENT DOCUMENTS

| | | | | |
|---|---|---|---|---|
| 8,942,483 | B2 * | 1/2015 | Janky | G06V 20/10 |
| | | | | 382/113 |
| 10,326,689 | B2 * | 6/2019 | Liu | H04W 40/16 |
| 10,939,244 | B1 * | 3/2021 | Pope | H04W 4/90 |
| 11,140,704 | B2 * | 10/2021 | Lin | H04W 76/15 |

(Continued)

OTHER PUBLICATIONS

Ishihara, Tatsuya et al., "Deep Radio-Visual Localization", 2018 IEEE Winter Conference on Applications of Computer Vision, Mar. 12, 2018, Abstract only.

(Continued)

*Primary Examiner* — K. Wong
(74) *Attorney, Agent, or Firm* — Robert P. Michal, Esq.; Carter, DeLuca & Farrell LLP (57) ABSTRACT

It is provided a method, including providing location information indicating a location of a terminal to a radio-independent localization and tracking system; evaluating at least one of environmental information and tracking information received from the radio-independent localization and tracking system with respect to the terminal in response to providing the location information; managing a resource for serving the terminal based on the at least one of the environmental information and the tracking information, wherein the environmental information includes information about an environment of the terminal, and the tracking information includes information about a track of the terminal.

1 Claim, 7 Drawing Sheets

(56) References Cited

U.S. PATENT DOCUMENTS

| | | | | |
|---|---|---|---|---|
| 11,792,605 | B2* | 10/2023 | Daoura | H04L 67/563 |
| | | | | 340/539.13 |
| 11,852,493 | B1* | 12/2023 | Schaefer | G01C 21/3476 |
| 2010/0120436 | A1* | 5/2010 | Feldman | H04W 64/00 |
| | | | | 455/456.3 |
| 2013/0033999 | A1* | 2/2013 | Siomina | H04W 64/00 |
| | | | | 370/252 |
| 2015/0339823 | A1 | 11/2015 | Siomina | |
| 2019/0230475 | A1* | 7/2019 | Edge | G01S 5/02 |
| 2020/0389759 | A1* | 12/2020 | Wang | H04W 4/023 |
| 2022/0256310 | A1* | 8/2022 | Volkerink | H04W 4/024 |
| 2022/0256631 | A1* | 8/2022 | Jain | H04W 36/322 |
| 2023/0065219 | A1* | 3/2023 | Caro | G06F 1/163 |

OTHER PUBLICATIONS

Papaioannou, Savvas et al., "Tracking People in Highly Dynamic Industrial Environments", IEEE Transactions on Mobile Computing, IEEE Service Center, Los Alamitos, CA, vol. 16 No. 8, Aug. 1, 2017, pp. 2351-2365.

Biswas, Joydeep et al., "Depth Camera Based Indoor Mobile Robot Localization and Navigation", Robotics and Automation (ICRA), 2012 IEEE, May 14, 2012, pp. 1697-1702.

* cited by examiner

OPTIMIZING RESOURCE OF A TERMINAL ALLOCATION BY COMPUTER VISION

CROSS REFERENCE TO RELATED APPLICATION

This patent application is a U.S. National Stage application of International Patent Application Number PCT/EP2019/073002 filed Aug. 28, 2019, which is hereby incorporated by reference in its entirety.

FIELD OF THE INVENTION

The present invention relates to using information from a computer vision system to optimize resource allocation of a terminal (UE).

Abbreviations

3GPP 3$^{rd}$ Generation Partnership Project
3G/4G/5G 3$^{rd}$/4$^{th}$/5$^{th}$ Generation
ACK Acknowledged
A-GNSS Assisted Global Navigation Satellite System
AoD Angle of Departure
API Application Programming Interface
BVDM Building Vector Data Map
CAM camera
CN Core Network
CSI Channel State Information
CSI-RS CSI-Reference Signal
CV Computer Vision
DL Downlink
eMBB Enhanced Mobile Broadband
eNB eveloved NodeB
FCC Federal Communications Commission
FOV Field of View
FR Frequency Range
gNB Next generation NodeB
GNSS Global Navigation Satellite System
HO Handover
IAB Integrated Access and Backhaul
ID Identifier
IE Information Element
IoT Industrial Internet of Things
IP Internet Protocol
ITU-R International Telecommunication Union-Radiocommunication Sector
LMC Location Management Component
LMF Location Management Functionality
LOS Line of Sight
LPP LTE Positioning Protocol
LTE Long-term Evolution
MAC Medium Access Control
MDT Minimization of Drive Tests
MEC Multi-Access Edge Computing
ML Machine Learning
MME Mobility Management Entity
mmW millimetre waves
MRO Mobility Robustness Optimization
NACK Not Acknowledged
NG Next Generation
NR New Radio
OTDOA Observed Time Difference of Arrival
PHY Physical (layer)
QoS Quality of Service
RACH Random Access Channel
RAN Radio Access Network
RAT Radio Access Technology
Rel Release
REM Road Experience Management
RF Radio Frequency
RNA RNSAP User Adaption
RNSAP Radio Network Subsystem Application Part
RRC Radio Resource Control
RRM Radio Resource Management
Rx Receive
SON Self-Optimizing Networks
SSB Synchronization Signal Block
TR Technical Report TRP Transmission Point
Tx Transmit
UE User Equipment
URLLC Ultra-Reliable and Low-Latency Communications

BACKGROUND OF THE INVENTION

A main driver for UE positioning (i.e. determining the position of the UE) in cellular networks are FCC E911 requirements [1]. In LTE, the information on UE position has been considered unknown or known with a low level of resolution. With the introduction of very sensitive use-cases like URLLC, 5G-NR needs to ensure that the information on UE position and location (environment) is known in order to improve mobility, service continuity and quality aspects.

In NR Rel-15, only Cell-ID (with cell portion ID) and RAT-independents methods (e.g., A-GNSS) based on LTE LPP were specified. Standalone NR positioning methods for Rel-16 (especially RAT-dependent techniques) were studied in the RAN1 study item "Study on NR positioning support (Release 16)". The key findings are summarized in the resulting 3GPP TR 38.855: Technical Specification Group Radio Access Network; Study on NR positioning support (Release 16), v 2.1.0, 2019.

Specification is currently ongoing in the Rel-16 work item "NR Positioning Support" RP-190752, New WID: NR Positioning Support, Intel, RAN #83, March 2019.

RAN2 agreed in the meeting #105 that Location Management functionality (LMF) in NG-RAN is recommended for normative work. RAN Plenary Meeting #83 on March 2019 agreed to start a "Study on local NR positioning in RAN" in Q3 2019. The LMF in NG-RAN is called Location Management Component (LMC).

In practice, accurate positioning plays a key role in 5G NR networks and the industry is exploiting new data domains for providing this information. The need for improving the network by incorporating external systems as sources of relevant information is becoming paramount and is aligned with emerging topics such as Digital Twins and Mirror World concepts. Interaction between radio networks and industrial platforms is also a key subject of Rel. 17 and beyond.

One of the distinctive features of NR is the reliance on sophisticated beam steering by highly directive antenna arrays. Although not exclusive to, continuous and efficient beam tracking is substantially indispensable for FR2 bands 257 to 511, commonly referred to as millimeter waves (mmW).

In NR, positioning is no longer an add-on feature and device tracking requirements are stricter due to the quasi-optical behavior of mmW wireless links, the beam-centric design, and the foreseen network densification, which increases the likelihood of a LOS between UE and the antenna array but also the number of positioning and mobility related events (HOs, beam reselections, etc.).

Numerous solutions for UE positioning and beamforming in cellular networks exist, but they are chiefly based on appropriate radio signal structure, radio propagation-based measurements and advanced signal processing. However, most radio-only solutions suffer from excessive delays and/or become very intricate when many narrow beams are deployed. Furthermore, these solutions hardly address—with the required proactivity and accuracy—the transitions of devices from outdoor to indoor environments (indoor/outdoor, street/train, etc). Furthermore, the availability of wireless communication network may be compromised, e.g. due to lack of UE measurements, unexpected radio interference, unexpected blocking of the communication channel, etc.

Anticipating these changes efficiently is particularly important for MRO and SON. MRO adapts the radio resources to the average user mobility profile. Thereafter, it is not able to react optimally when the mobility profile of a UE differs from the average. The current MRO can optimize the handover parameters only at the granularity of a cell pair and/or UE group, but cannot provide in real-time more detailed knowledge of the varying number of UEs and their trajectories (e.g. outdoor to indoor).

A survey of the techniques specified for LTE positioning (as well as previous generations) is found in [6]. Below we list related academic and industrial work:

[1] Federal Communication Commission (FCC), Fourth Report and Order: "Wireless E911 Location Accuracy Requirements", FCC-15-9, Docket #07-114, 2015. https://www.fcc.gov/document/fcc-adopts-new-wireless-indoor-e911-location-accuracy-requirements

[2] 3GPP TR 38.855 V16.0.0 (2019-03), 3rd Generation Partnership Project; Technical Specification Group Radio Access Network; Study on NR positioning support (Release 16)

[3] K. Doppler, E. Torkildson and J. Bouwen, "On wireless networks for the era of mixed reality," 2017 European Conference on Networks and Communications (EuCNC), Oulu, 2017

[4] M. S. Elbamby, C. Perfecto, M. Bennis and K. Doppler, "Toward Low-Latency and Ultra-Reliable Virtual Reality," in IEEE Network, vol. 32, no. 2, pp. 78-84, March-April 2018.

[5] Mohammed S. Elbamby, Cristina Perfecto, Mehdi Bennis, and Klaus Doppler, "Edge Computing Meets Millimeter-wave Enabled VR: Paving the Way to Cutting the Cord"

[6] J. A. Del Peral-Rosado et al., "Survey of Cellular Mobile Radio Localization Methods: From 1G to 5G", in IEEE Communications Surveys & Tutorials, vol. 20, no. 2, 2018

Integration of RAN localization and CV is described e.g. in:

[7] A. Alahi, A. Haque and L. Fei-Fei, "RGB-W: When Vision Meets Wireless," 2015 IEEE International Conference on Computer Vision (ICCV), Santiago, 2015, pp. 3289-3297. doi: 10.1109/ICCV.2015.376RGB-W

[8] S. Papaioannou, A. Markham and N. Trigoni, "Tracking People in Highly Dynamic Industrial Environments," in IEEE Transactions on Mobile Computing, vol. 16, no. 8, pp. 2351-2365, 1 Aug. 2017. doi: 10.1109/TMC.2016.2613523

[9] T. Ishihara, K. M. Kitani, C. Asakawa and M. Hirose, "Deep Radio-Visual Localization," 2018 IEEE Winter Conference on Applications of Computer Vision (WACV), Lake Tahoe, N V, 2018, pp. 596-605. doi: 10.1109/WACV.2018.00071

An exemplary computer vision technique that can be used to track users/objects of interest and calculate velocities based on depth images and time-series is disclosed in:

[10] J. Biswas and M. Veloso, "Depth camera based indoor mobile robot localization and navigation," 2012 IEEE International Conference on Robotics and Automation, Saint Paul, M N, 2012, pp. 1697-1702. doi: 10.1109/ICRA.2012.6224766

[11] P. Viola and M. Jones, "Rapid object detection using a boosted cascade of simple features," Proceedings of the 2001 IEEE Computer Society Conference on Computer Vision and Pattern Recognition. CVPR 2001, Kauai, HI, USA, 2001, pp. I-I. doi: 10.1109/CVPR.2001.990517

SUMMARY OF THE INVENTION

It is an object of the present invention to improve the prior art.

According to a first aspect of the invention, there is provided an apparatus, comprising means for providing configured to provide location information indicating a location of a terminal to a radio-independent localization and tracking system; means for evaluating configured to evaluate at least one of environmental information and tracking information received from the radio-independent localization and tracking system with respect to the terminal in response to providing the location information; means for managing configured to manage a resource for serving the terminal based on the at least one of the environmental information and the tracking information, wherein the environmental information comprises information about an environment of the terminal, and the tracking information comprises information about a track of the terminal.

According to a second aspect of the invention, there is provided an apparatus, comprising means for identifying configured to identify an object in a first representation of an environment of the object based on location information received from a wireless network; means for generating configured to generate at least one of environmental information and tracking information of the object from a second representation of the environment; means for providing configured to provide the at least one of the environmental information and the tracking information to the wireless network in response to receiving the location information, wherein the location information indicates a location; the environmental information comprises information about the environment of the object, and the tracking information comprises information about a track of the object.

According to a third object of the invention, there is provided an apparatus, comprising means for monitoring configured to monitor if a request to measure a beam profile of a downlink receive beam is received; means for controlling configured to control, if the request is received, a means for setting and a means for measuring such that the means for setting sets a direction of the downlink receive beam to at least two different directions; and the means for measuring measures a respective channel state information for each of the at least two different directions; means for reporting configured to report the respective channel state information for each of the at least two different directions.

According to a fourth aspect of the invention, there is provided a method, comprising providing location information indicating a location of a terminal to a radio-independent localization and tracking system; evaluating at least one of environmental information and tracking information received from the radio-independent localization and tracking system with respect to the terminal in response to providing the location information; managing a resource for serving the terminal based on the at least one of the environmental information and the tracking information, wherein the environmental information comprises information about an environment of the terminal, and the tracking information comprises information about a track of the terminal.

According to a fifth aspect of the invention, there is provided a method, comprising identifying an object in a first representation of an environment of the object based on location information received from a wireless network; generating at least one of environmental information and tracking information of the object from a second representation of the environment; providing the at least one of the environmental information and the tracking information to the wireless network in response to receiving the location information, wherein the location information indicates a location; the environmental information comprises information about the environment of the object, and the tracking information comprises information about a track of the object.

According to a sixth aspect of the invention, there is provided a method, comprising monitoring if a request to measure a beam profile of a downlink receive beam is received; performing control, if the request is received, such that a direction of the downlink receive beam is set to at least two different directions and a respective channel state information is measured for each of the at least two different directions; reporting the respective channel state information for each of the at least two different directions.

Each of the methods of the fourth to sixth aspects may be a method of optimizing resource allocation.

According to a seventh aspect of the invention, there is provided a computer program product comprising a set of instructions which, when executed on an apparatus, is configured to cause the apparatus to carry out the method according to any of the fourth to sixth aspects. The computer program product may be embodied as a computer-readable medium or directly loadable into a computer.

According to some embodiments of the invention, at least one of the following advantages may be achieved:
Resource allocation in the wireless network may be improved;
Mobility in the wireless network may be improved;
Relatively small bandwidth requirements on the link between CV system and the wireless network.

It is to be understood that any of the above modifications can be applied singly or in combination to the respective aspects to which they refer, unless they are explicitly stated as excluding alternatives.

BRIEF DESCRIPTION OF THE DRAWINGS

Further details, features, objects, and advantages are apparent from the following detailed description of the preferred embodiments of the present invention which is to be taken in conjunction with the appended drawings, wherein.

DETAILED DESCRIPTION OF CERTAIN EMBODIMENTS

Herein below, certain embodiments of the present invention are described in detail with reference to the accompanying drawings, wherein the features of the embodiments can be freely combined with each other unless otherwise described. However, it is to be expressly understood that the description of certain embodiments is given by way of example only, and that it is by no way intended to be understood as limiting the invention to the disclosed details.

Moreover, it is to be understood that the apparatus is configured to perform the corresponding method, although in some cases only the apparatus or only the method are described.

Conventionally, information about the UE environment type (indoor, outdoor), direction, change of location etc. is only available to the RAN through radio measurements. On the other hand, a properly trained computer vision solution can easily determine, for example, if a person/device of interest has entered a train and will leave the station. Based on this information, one may easily decide if it would be better to handover the UE to an on-board small-cell or to a sub-6 GHZ macro cell covering the entire train station area. Some example embodiments of this invention exploit this insight.

Furthermore, some example embodiments of this invention address the problem how to minimize the impacts of lower availability of wireless communication network. They complement the RRC/RRM using CV. Some example embodiments of the invention track such transitions before radio measurement results become available by leveraging non-radio data such as CV.

A sub-problem of practical interest is also addressed by some example embodiments of this invention- and to the best of the inventors' knowledge so far neglected by prior art: the identification and matching of the RAN service area that will be analysed by the RAT-independent localization technique. In the present context, the term "matching" denotes what is known as spatiotemporal registration in the multi-sensor fusion community.

Some example embodiments of the invention provide a bi-directional exchange of configuration, assistance, and event information between (one or multiple) radio network elements and (one or multiple) devices with computer-vision (CV) based localization and tracking capabilities. By means of dedicated signaling and interfaces the CV-based information may be used to augment the spatial awareness and performance of radio resource management (RRM) algorithms, more notably mobility and beam management algorithms.

Figure 1:
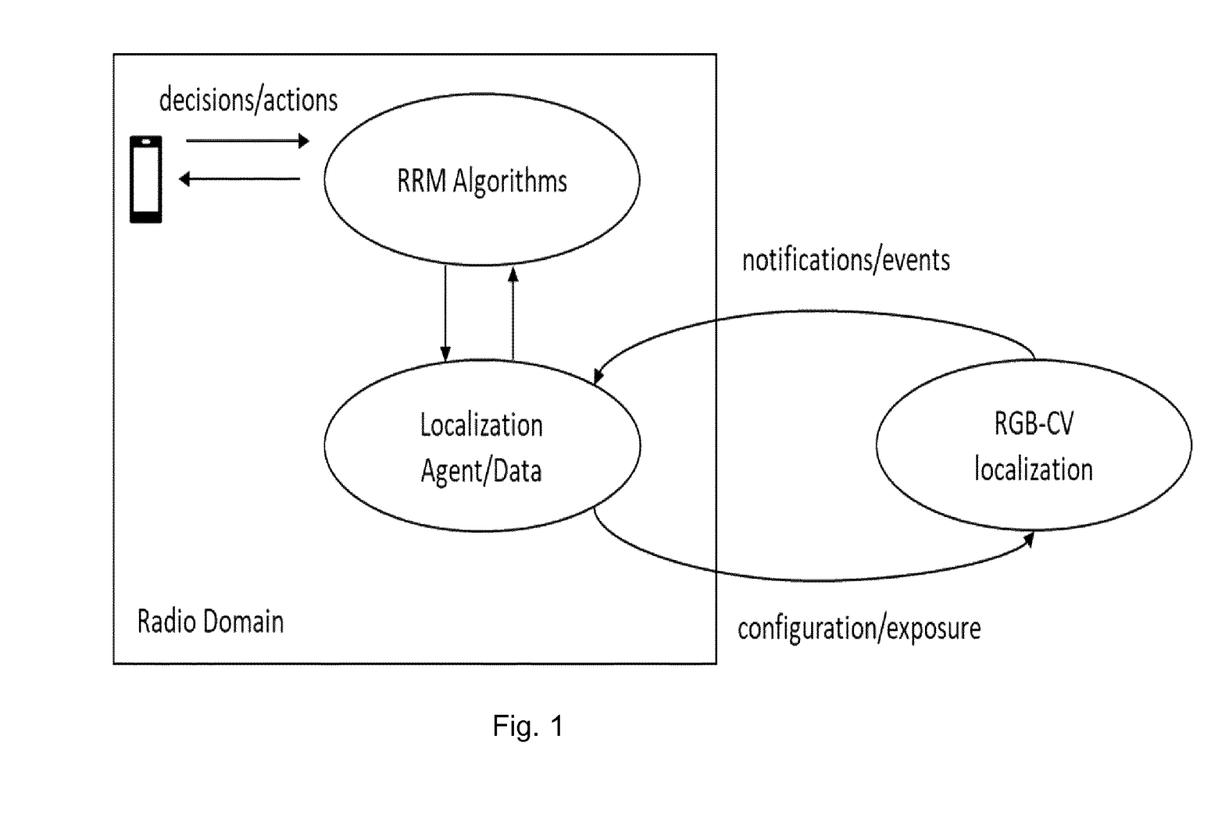
FIG. 1 illustrates some example embodiments of the invention on a high level.

FIG. 1 illustrates some example embodiments of the invention on a high level. In general, the CV system needs some spatial guidance to know where (potentially swivelling) cameras should point to and which devices to track and classify. The "configuration/exposure" arrow in FIG. 1 illustrates that the wireless network (e.g. radio domain, more specifically: the localization agent) conveys assistance information to the CV system (the localization system in the CV system), such that the CV system understands the RAN service area to be monitored. Namely, the wireless network may provide location information to the CV such as angular information (azimuth, elevation, 3 dB beamwidth) regarding beams serving one or more RRC connected devices (terminals (UEs)) or even the spatial coordinates (x, y, z, lat-long, etc) of one or more RRC connected devices obtained directly from the device via other radio-independent localization methods (e.g. GNSS) and conveyed to the network using features such as MDT signalling. Thus, CV may generate tracking information of the one or more RRC connected devices such that the wireless network may benefit from the CV tracking information generated by CV.

If the CV system receives the location information from the wireless network, it may typically not detect the terminal (UE) at (or close to) that location but instead, it may detect an object, such as a human being carrying the terminal or a car or a train, in which the terminal is located. The CV system may generate tracking information or environmental information for this object and the RAN may consider this environmental information or tracking information as being related to the terminal.

The CV system can detect (predict) a coming change how the wireless network may serve the terminal. For example, the CV system can detect the geographical area where the wireless network may not be able to provide the communication services at desired QoS. As another example, CV system may predict an unexpected high uplink load condition due to public demonstration, or an obstacle blocking the beam-based coverage at higher frequencies above 6 GHz. The CV system can further provide information to the network about the geographical area and possibly the constrains of blocking obstacles (environmental information). The CV system can also visually observe the number of UEs, UE waypoints, UE speed, and mobility parameters (tracking information). The CV system provides such information to the wireless network (arrow "notifications/events"). Some of this information may be collected by the wireless network, too, for example in MEC. The wireless network may use such information from CV system to optimize the wireless network (interaction between Localization agent/data and RRM algorithms). In this case the optimization algorithm in the wireless network (e.g. in MEC or gNB) may be triggered based on the CV system input.

In order to benefit from the environmental information and/or tracking information, the RAN needs to be able to understand the events detected by the CV system. The CV system may signal previously configured or predetermined events to the wireless network (e.g. RAN) through a localization entity. Preferably, the localization entity resides as close as possible to the air interface.

From a conceptual point of view, there may be three conceptual stages as follows:
I. Rollout stage: Definition and physical/logical provisioning of a communication interface between CV-enhanced RGB cameras and RAN nodes (e.g. gNBs) to allow for the real-time exchange of control signaling and data.
II. Preparation stage: RAN and CV define one or more devices (e.g. connected UEs) of interest. The one or more devices are defined based on their respective locations. The set may be extendible. Preferably, a handshake protocol is used in this stage. RAN and CV may additionally define a set of transition events for the event stage. However, in some example embodiments, RAN just informs CV on the events it wants to be notified about.
III. Event stage: The CV-enhanced RGB cameras notifies gNB about a transition in UE's state (tracking information) and/or about the environment of the UE (such as position of obstacles near the UE). The RRM (mobility) algorithms in the RAN make use of this additional knowledge to optimize its decisions.

Since the CV system may fail or be corrupted, in some example embodiments, the output of the CV system augments the information used for RRM decisions and actions but does not drive them. In other words, the RAN may ignore the output of the CV system (such as reported events) if the RAN decides to do so. Some example embodiments of the invention do not use additional maps and/or real-time access to georeferenced and/or multi-layered data bases (e.g. radio environmental maps or digital twins), while other example embodiments of the invention integrate one or more of such pieces of information.

Prior art documents [5]-[7] focus on the utilization of wireless solutions to improve the performance of positioning and people tracking systems based on computer vision techniques. In contrast, according to some example embodiments of the invention, the wireless network is improved by means of the CV system. I.e., the intention of these example embodiments is opposite to that of the prior art [5] to [7]. As a consequence, in the prior art RAN-related parameters are not exposed to the CV-system, while according to some example embodiments of the invention, RAN-related parameters (such as the location of the UE determined by RAN) are exposed to the CV system.

Hereinafter, an example embodiment is discussed at greater detail.

Figure 2:
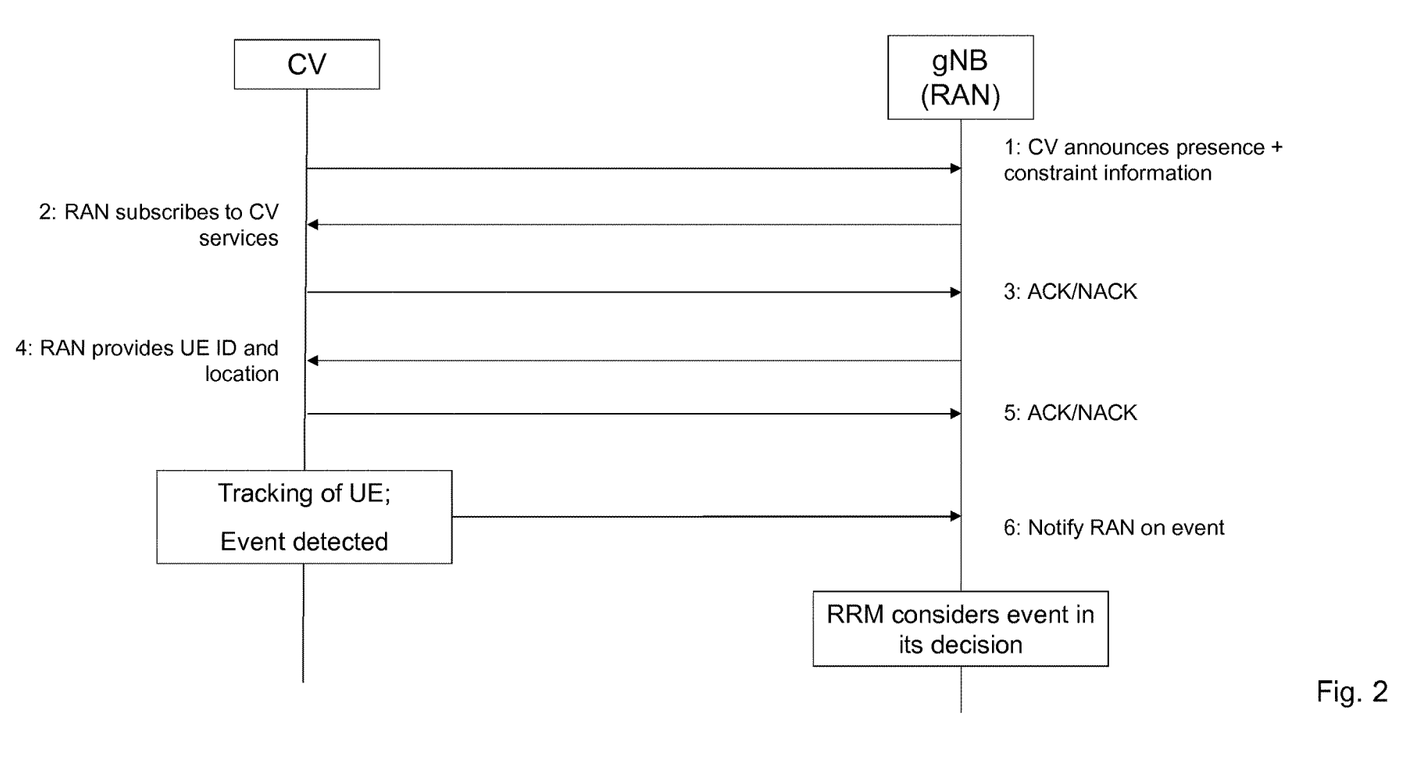
FIG. 2 shows a message exchange according to some example embodiments of the invention.

Some example embodiments of this invention exchange and utilize information obtained from one or more CV systems for enhancing the spatial awareness capabilities of a wireless network. FIG. 2 shows a message exchange according to some example embodiments of the invention. The flow is as follows:
1. CV including one or more cameras announces its presence and provides constraint information to RAN (e.g. gNB or MEC). The constraint information may comprise e.g. one or more of the following: FoV, zoom, pan, and tilt constraints; coordinates, height, elevation, and azimuth of the camera(s). Thus, the constraint may define a two- or three-dimensional space which may be monitored by the camera(s). CV may also indicate the services (types of tracking information and environmental information) it may offer.
2. RAN subscribes to a subset or all of the offered services.
3. CV acknowledges the subscription of message 2.
4. RAN sends respective IDs of one or more UEs for which assistance from CV is desired to CV. The IDs may be conventional IDs such as IMSI, or they may be specially generated IDs for the communication between RAN and CV. In the latter case, the specially generated IDs map 1:1 to the conventional IDs. However, the mapping is known to RAN only but not to CV. Thus, privacy may be preserved. In addition, RAN provides radio based localization information of the UE(s) to CV. The localization information may comprise e.g. respective estimated AoD based on SSB beam or CSI-RS beam for each of the UEs for which assistance is desired. It may comprise GNSS coordinates provided from the UE to RAN.

5. CV acknowledges receipt of the UE ID(s) and related location information.
6. CV starts tracking of the UEs. When an event according to the subscribed services occurs, CV notifies RAN of the event. For example, such an even may be that the UE enters a moving vehicle or disappears behind an obstacle.
7. RRM in RAN takes the notification from RAN into account in order to decide on resource allocation for the UE.

Messages/actions 6 and 7 may be continues until they are stopped by RAN and/or CV system. In addition, some authentication and authorization procedures may be performed between RAN and CV, e.g. at or in between each of the steps (not shown).

It is recommended that the message exchange of steps 1 to 6 is standardized. However, it is not recommended to standardize the specific CV-algorithm performing the localization and tracking procedures (step 6). It may serve as vendor differentiation mechanisms. An exemplary algorithm is found in and the seminal work in [11]. The latter has been extended countless time to track different features/objects of interest. However, the interface, the handshake and an extensible library of events to be reported requires proper standardization to make visual and radio solutions from different vendors interoperable.

Some of the messages in FIG. 2 are optional. For example, messages 1 to 3 correspond to the rollout stage I. Instead of a negotiation between RAN and CV, each of these systems may be configured separately with the respective parameters of the other system. Acknowledgments (messages 3 and 5) may be omitted. Messages 4 and 5 correspond to the preparation stage II, and messages 6 and 7 correspond to the event stage III described hereinabove.

Figure 3:
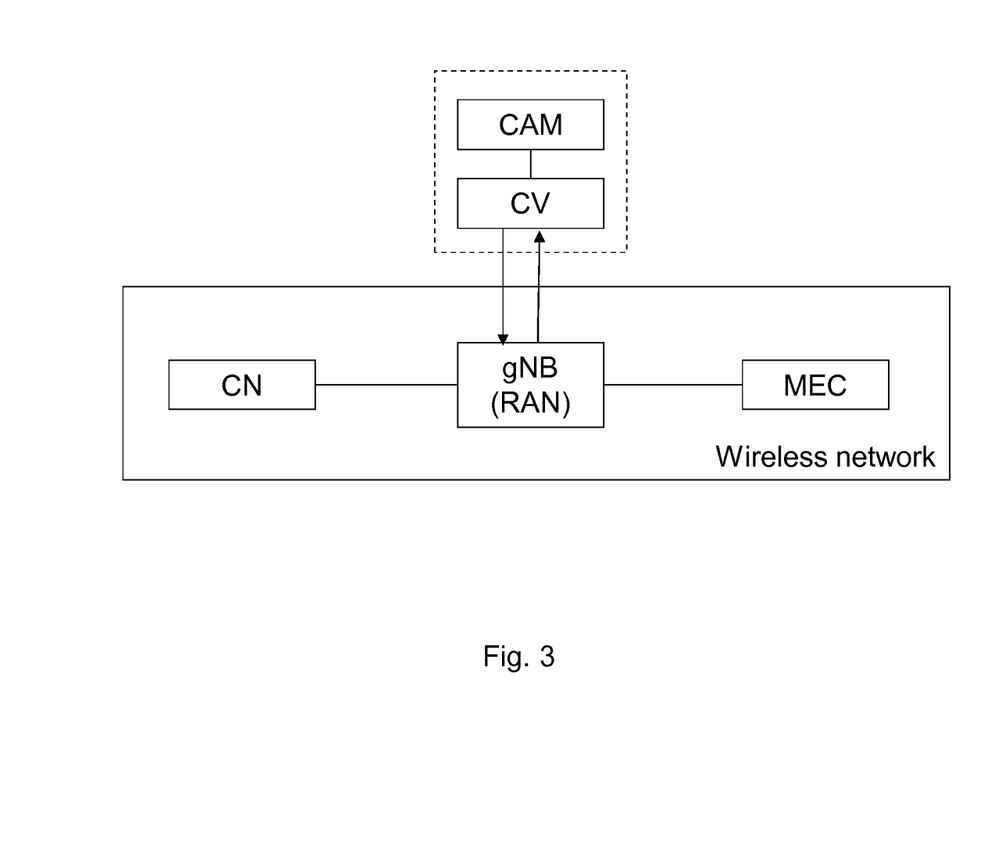
FIG. 3 shows an example embodiment of the invention.

FIG. 3 shows an example embodiment of the invention. A CV system with a camera is communicating with a wireless network. The CAM may be integrated with the CV system (also called "smart CAM", indicated by a dashed line rectangle). However, a modular separation between the camera and the CV intelligence is advantageous since the latter technology evolves much faster than the former. The CV system may be connected to and/or integrated with more than one cameras. In the example embodiment, the CV system is connected to RAN (gNB) of the wireless network. In general, the CV system may be connected to other parts of the wireless network instead, such as CN or MEC. Bringing the interaction closer to the air interface, i.e. to the gNB rather than to the CN, makes the system more responsive. The interaction is preferably limited to events and (extensible) assistance data, i.e. the video feed is not visible to the RAN for privacy and complexity reasons. This interface allows passing the signalling or the handshake procedure between the wireless network (preferably: RAN) and the CV system. It is recommended to standardize the interface (defining objects/elements and signalling procedure).

Figure 4:
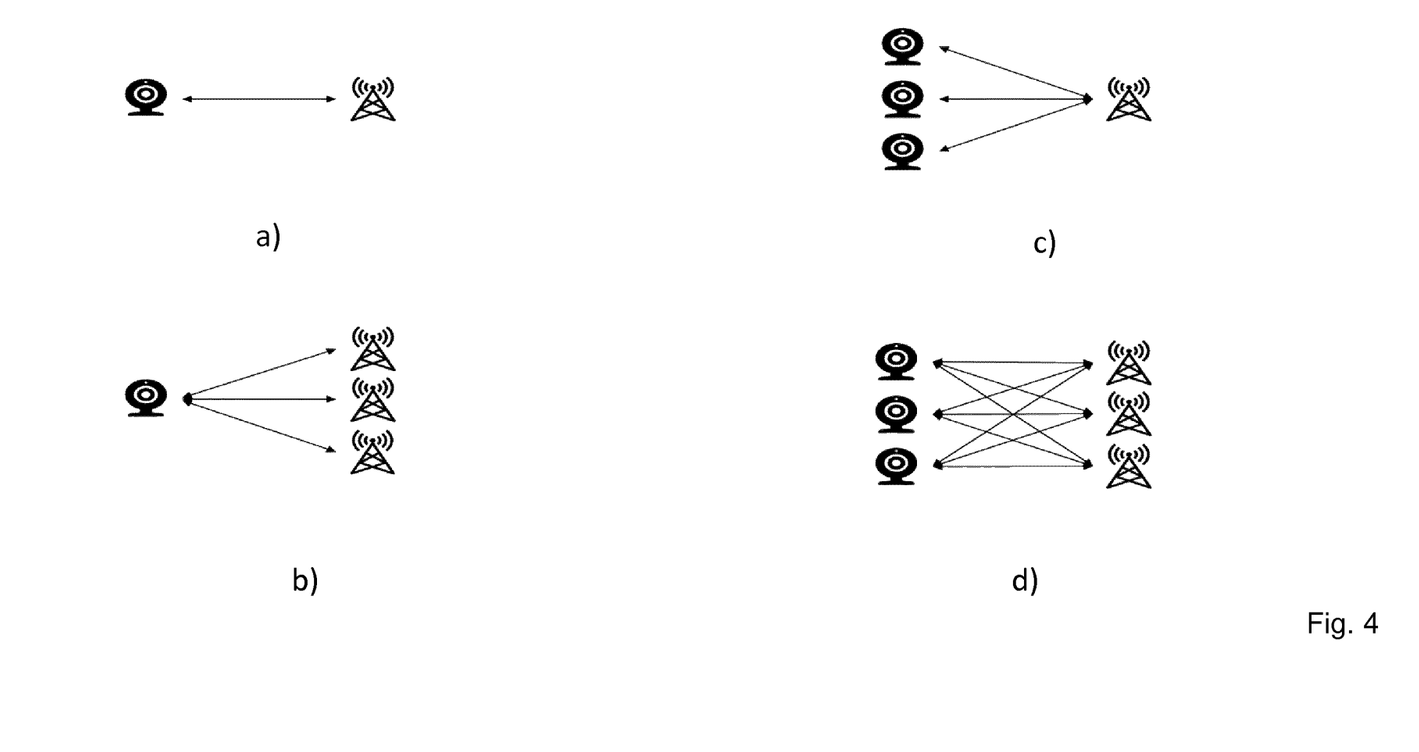
FIG. 4 shows example associations between camera(s) of the CV system and antenna (array(s)) of the wireless network (wireless communication network)

FIG. 4 illustrates some alternatives for the spatial correlation between the (smart) cameras and the base stations (antenna arrays). These cases are strongly coupled with the network topology, so placement and connections between "smart cameras" and network nodes should exploit the types of sites deployed to minimize infrastructure deployment costs while maximizing the expected benefits.

The simplest case is a one-to-one mapping (FIG. 4a), where the CV solution is co-sited with a (macro) cellular tower so that the field of view of a camera matches as much as possible the coverage of a cell sector. Another possibility is to have a camera on top of a tower, providing a visual localization/tracking to a multitude of small cells (many-to-one, FIG. 4b) within the coverage area of the macro-cell hosting the visual system. FIG. 4c shows the option "many to one" where plural cameras monitor the coverage area of one cell (e.g. of an omni cell). As a further option, a many-to-many configuration (FIG. 4d) is possible, too. In general, the camera(s) may be placed independently from the radio infrastructure, making several combinations and generalizations possible.

RAN and the CV system(s) exchange information for the matching and identification of the region that will be analysed. This step will be preferably performed at the roll-out stage the network, but it can also be done on-demand basis when the RAN subscribes to the services provided by the CV-system. Alternatively, the respective information may be configured separately in the respective other system.

For example, the CV will inform/advertise the RAN about the area covered by its camera(s) and pertinent technical feature such as resolution, field of view (FOV), refresh rate, detection and mechanical and computerized tracking capabilities. Ensuring there is a match between the coordinates used by the visual and radio systems is essential to guarantee the desired performance. Stereoscopic cameras may add depth information and can augment/facilitate the matching procedure. However, stereoscopic cameras are not required according to some example embodiments of the invention.

Because 5G NR is a system that heavily relies on beams which have attributes such as elevation, azimuth and aperture which are used by RGB video cameras as well, the matching between the video map and the radio domains can come naturally. Once again, the co-sited one to one mapping roll-out scenario depicted in FIG. 4a is the simplest one, especially because the antennas and the camera may only differ with respect to the z coordinate and FOV. However, the geometrical conversions to and from the same spatial frame of reference is an implementation specific issue. It may be covered by the signalling exchanged during the roll-out stage.

Alternative and more complex approaches for the matching may include RF fingerprinting, the utilization of building vector data maps (BVDM)—that might be available for the same area—so that an even more accurate mapping becomes possible. This possibility will be discussed further subsequently, and it represents a step in the direction of having a digital twin of the area of interest which includes (real-time) knowledge about the RGB (visual) domain and radio domains.

In the second stage (preparation state II) a handshake protocol may be used between RAN and CV to trigger the tracking procedure for one or multiple connected devices/users of interest. For example, this step may be performed on the following occasions:

a. During RACH (transition to connected mode), in the case the CV is already available;
b. Upon availability of CV, in the case the UE already existed in the RAN yet no video feed was available for the area where the UE has been moving prior to entering the visual field of the particular CV system.

These occasions are not limiting. Also, the preparation step may be performed for UEs having some sensitive traffic in order to reduce the load on the systems and interfaces.

The handshake may done by exploiting the matching (registration) setup previously. It can be done triggered from both gNB side and both CV side. An example embodiment is as follows:

The gNB signals the CV the existence of the active UE(s) of interest in the areas known to be covered by the CV-system service. The RAN shares/exposes a configurable fraction of the localization data (or all the localization data) related to the devices of interest to assist the visual tracking assistance, e.g. angular information (azimuth, elevation, 3 dB beamwidth, beam index), or even the spatial coordinates (x, y, z, lat-long, etc) obtained directly by the device(s) via other radio-independent localization methods and which the device(s) conveyed to the RAN using features such as MDT signalling. Sharing the coordinates greatly facilitates the tracking and classification of the conditions but raises privacy and security concerns and should be used when the CV-system is a trusted computing platform.

The CV will then attempt to identify and track the UE(s). The CV can either send already information regarding the UE, or just acknowledge that the identification is performed. Frequently, the CV may not identify the UE itself but an object (person, vehicle, train etc.) carrying the UE. In case the identification is unsuccessful, the CV sends an appropriate error notification to the gNB through dedicated signalling. Because the visual system can fail, in a preferred embodiment its outputs augment rather than drive the RRM decisions.

In the event stage III, several example embodiments are possible, and some of them are described here:
  a) The CV sends information about any change in the UE state to the RAN, without being triggered by RAN:
  Non-limiting examples of these changes can be:
  i. Change in UE direction
  ii. Change of environment indoors/outdoors
  iii. Change in UE movement type: pedestrian/vehicular/train/plane
  iv. Etc: in front of a blockage, behind a blockage, etc
  b) The gNB inquires for information regarding the UE location when preparing for an event. A non-limiting example, is the preparation of a HO: the gNB may ask for the environment type of the UE and adapt the MRO parameters using the enhanced intelligence provided by the CV system. The CV system replies with the requested information.

In both cases, the CV sends environmental and/or tracking information related to the UE to RAN.

In general, some example embodiments of the invention split the responsibilities between the radio and the visual domain as follows:
  RAN: Radio-based localization, utilization (for RRM purposes), centralization and controllable exposure of information coming from other localization techniques: REM, A-GNSS, Digital Twins
  CV-System: Feature detection, structure from motion and classification of conditions related to the received coordinates and/or devices of interest.

As stated previously, the RAN may have full autonomy to heed or ignore the events signaled by the CV-based system when taking actions. As a non-limiting exemplary use case, it may decide to neglect radio-domain-triggered handover events such as an intra-frequency handover event, in light of direction of movement and speed events extracted from motion by the visual system. For example, an intra-frequency handover event may be triggered when the signal from the serving cell becomes worse than threshold1 and the signal from the neighbor cell becomes better than threshold2. Both thresholds may be tunable parameters (event "A5").

In the following we describe an advanced use case at greater detail. It targets a 'smart gNB' concept. Note, 'smart gNB' denotes a gNB who has detailed knowledge of the environment and the most likely further evolution regarding its served cells so that an almost optimal PHY, MAC and RRM layer processing becomes reality, which is conventionally not possible just based on a few high level event reports. The umbrella idea is what has lately been called a mirror world and the fusion of multiple data sources. So far, it is open how to achieve the related accurate knowledge of the mirror world with reasonable overhead. Some example embodiments of the invention provide a solution to this problem:
  A first consideration is regarding the camera to gNB (or cloud like MEC, etc.) interface, which would generate huge data rates if streamed constantly with high quality from the cameras to the gNB. While such streaming might be possible if done over a high capacity backbone network, it would have limitations in case of e.g.
    i) this connection includes a wireless link for example in case of an integrated access and backhaul (IAB),
    ii) there are latency requirements, which might suffer for best effort IP traffic in case of overload situations,
    iii) privacy concerns restrict the broad- or multicasting of the camera data and/or add complex as well as latency.
  In such cases it is not advisable to transmit the full camera streams. Therefore, in some example embodiments, the video feed itself is not transmitted to the wireless network.
  As described above, the CV might compress the camera video streams and extract only most relevant information for the given task to the 'mirror world'.
  assuming that a large part of the BVDM-defining the environment—is more or less static, this part can be assumed to be known at the CV as well as the gNB instance after some initialization. It need not be transmitted during event stage.
  The moving objects inside the static BVDM as well as the active mobile radio users together with their locations and movements are relevant and may be reported from CV system to the wireless network. As these moving objects can be other persons (sitting, nomadic, fast moving), bikes, cars, trucks, etc. these moving objects will have varying capabilities with respect to speed, acceleration, rotation capabilities, etc. For that reason, in some example embodiments of the invention, these moving objects including their capabilities are reported, as mentioned above.
  It is assumed that ML algorithms are able to properly classify these different types of moving objects. Over time more classes might be defined between the CV and the gNB.
  Moving objects with different capabilities then might be reported adapted to their characteristics, for example with different location update rates, with different moving or rotating vectors for their future location prediction.
  Depending on the scenario and the relative position of the moving objects, these might have more or less impact to the RF characteristics of the active users.

Therefore, it makes sense that the gNB informs the CV about relevant objects and/or about more or less often location updates with more or less accuracy.

Generally, a camera might cover areas with about 100 moving objects (ignoring some extreme cases like concerts, etc.). Providing 100 bit every 100 ms for each object would then end up in a moderate data rate of about few kbits per camera (instead of Mbits).

Another challenging task is the proper matching of a user identified in the CV with that user (UE) in the mobile radio system:

One natural option is to use accurate positioning based on GNNS or other NR localization methods for the UE of interest so that it can be mapped into the well known coordinates of the BVDM (known at the gNB as well as the CV).

At the same time, for NR currently discussed position accuracies might be not sufficient for a proper mapping, for example in case the inaccuracy is in the range of more than several tens of meter and one has to identify a person within a cluster of multiple closeby persons. For that case we propose an addition matching algorithm, for example triggered by the gNB. This could be, for example, a specific UE DL measurement, where the UE sweeps its Rx-beam over some predefined—or from the gNB requested—beam angles, doing some CSI measurements for each beam direction and reporting these measurement results back to the gNB. The gNB can then map the measured profile of measured beam CSI to the best fitting person, as being identified as candidates by the CV before. Alternatively, gNB may provide the measured profile to CV which may then identify the best fitting person based on the profile. As another option, super resolution techniques identifying certain multi path component parameters for certain multi TRP Tx signals may be used to determine the location of the UE with high precision.

According to some example embodiments, the CV system is integrated with the NR system (wireless network) using the MEC. The desired QoS for certain UE velocities and/or UE locations may be lower than expected. The network may not be able to decide an optimal operation due to lack of measurements for example when a varying number of UEs are having irregular data patterns. The CV system input to the network optimization may be routed using MEC processing and its output can be used to configure the relevant gNBs. The MEC requests the radio measurements and CV based information using an API where the request may include one or more UE measurements and CV entities.

Figure 5:
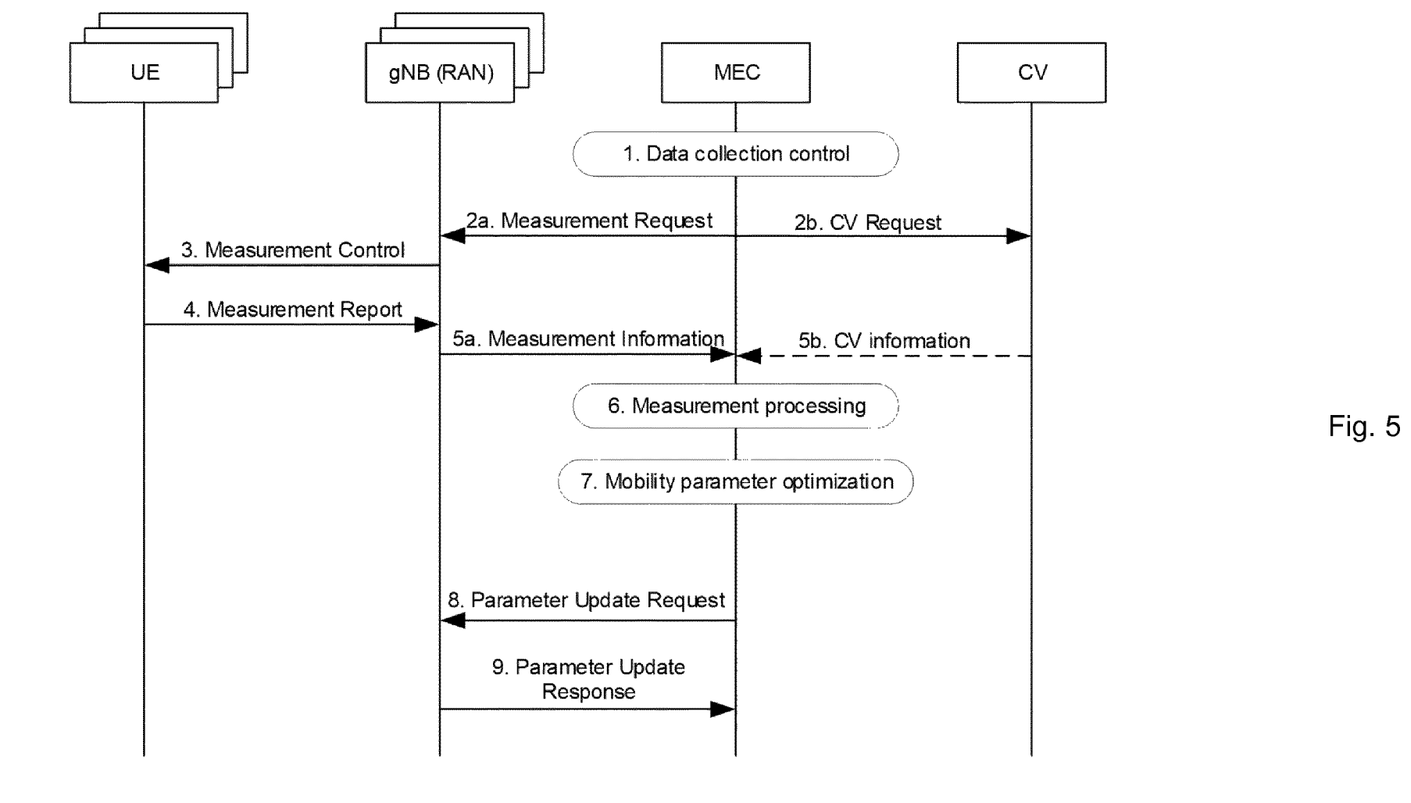
FIG. 5 is a message flow according to some example embodiments of the invention.

FIG. 5 shows a message flow according to some example embodiments of the invention:

1. The MEC initiates the measurement collection for a set of radio cells and CV systems associated to the radio cells.
2. MEC sends the Measurement Request and CV Request (i.e., the request to provide data from the CV system such as tracking information or environmental information) to the relevant gNBs and CV system entities, respectively.
3. gNB sends a measurement configuration with the measurement quantities to UEs. CV may indicated the UEs and/or from radio measurements, one may derive that the UEs are located in the vicinity of CV system. Optionally, gNB may indicate to the UE the need for a location-based measurement.
4. UE sends a measurement report to gNB with the requested measurement quantities and optionally its location.
5. gNB and CV forward the measurement and CV information reports to MEC.
6. MEC processes the UE based radio measurements and CV information.
7. MEC runs joint optimization of radio measurements and CV-system information to the radio network parameters based on the desired QoS.
8. MEC updates the parameters to gNBs, thus providing optimized mobility parameters, for example.
9. gNB acknowledges the Update to MEC. The gNB can also reject the update if the radio measurements are indicating the expected performance wouldn't be met with the new CV-system augmented configuration.

The gNB can update the UEs with the CV-system optimized parameters as part of the normal RRC procedures, e.g. either triggering immediate RRC Reconfiguration for UEs in RRC_CONNECTED state, during the next active data transmission and reception, as part of the mobility procedures (handover), as part of the RAN Notification Area updates in RRC_INACTIVE state, etc.

Some example embodiments of the invention provide a combination of CV and RRM where the CV gives a new dimension of insight to RRM. For registered users, the RAN is well aware of the UE location at cell level in RRC_CONNECTED state, RAN notification area level in RRC_INACTIVE (RNA can be a single cell), or tracking area level in RRC_IDLE. CV can complement this information.

In some example embodiments, RAN node utilizes UE's location information and retrieves information from CV outside of radio access. RAN uses the CV based information, for example, to modify the UE's context, e.g. adding potential routing information and uses the modified UE's context for mobility optimization. The mobility optimization may include, for example, cell prioritization during handover, prioritization of cell selection/reselection during low activity states (RRC_INACTIVE), preparation of conditional handover (CHO), or proactive push and preparation of UE's context to another gNB. This neighboring gNB may be identified according to CV input and complemented with radio measurements (or vice versa).

In a case where the user carrying the UE uses public transport, or in a city area, RAN determines passenger's UE position, mobility profile, speed and direction using CV positioning framework and whatever is available from RAN side, or RAT-independent methods such as GNSS. For example, the passenger enters the bus and CV detects this. When the bus starts to move along its route, the CV detects a change (UE→bus) and informs the network about the UE's position and velocity (=direct impact to RRC, e.g. handovers, cell reselections, CHO preparation, cell prioritization, re-establishment target, . . . ). The network (e.g. gNB) gets real-time information from CV, potentially including real-time vehicle locations. The CV could even determine the bus line (e.g. bus number) and, thus, what bus line the passenger is travelling. Therefore, network also knows bus line route, when connecting to external information source. The network may get the CV information and prioritize a cell of another gNB (e.g. use "gNB2" instead of "gNB1") in handover decision. The benefit is reduced number of ping pong handovers between gNB1 and gNB2.

Another benefit from CV is that the RAN could predict (in this case CV may be better than radio measurements) the next gNB (e.g. gNB2) and prepare the UE context to that gNB. In some example embodiments, either the CV makes the decision or CV creates a triggering event whether the UE context will be pushed to the next gNB. This also reduces the likelihood of UE Context fetch if the cell reselection was done in RRC_INACTIVE.

In other RRM or mobility optimization, the CV based location and trajectory information can be used together with the RRC protocol information when low and/or high data activity UEs in RRC_INACTIVE and RRC_CONNECTED state are present in a CV enhanced location. Specific RNA may be configured and signalled for the UEs whose UE Context or RRM is enhanced (in RAN) using this information. Since the RNA is not representing the gNB deployment but the UEs predicted route (CV+RRM), the UEs may remain in low activity state during some part or the whole route without unnecessary RNA update procedures. Example RNA procedures are indicated in 3GPP TS 38.300.

Advantages:

The mapping between the radio maps and the video feed are an important step in achieving the so-called "Universal Maps", the multi spectral, multi-sensory contextual navigation of "MirrorWorld".

Defining moving objects relative to a more static BVDM with different characteristics as well as capabilities allows a suitably adapted reporting per moving object, thereby minimizing the overall data rate for the CV-gNB interface.

Triggering specific UE measurement and reporting modes-like a specific beam sweeping-makes it possible to match candidate persons from the CV to active UEs from the RAN network.

The invention is an important enabler for ML for RAN as it allows the labelling of the UE and provides further information for UE profiling.

The MEC can be located in the gNB-CU and in this case the latency and signalling load would be minimized.

Figure 6:
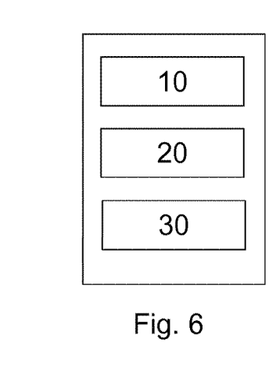
FIG. 6 shows an apparatus according to an embodiment of the invention.
Figure 7:
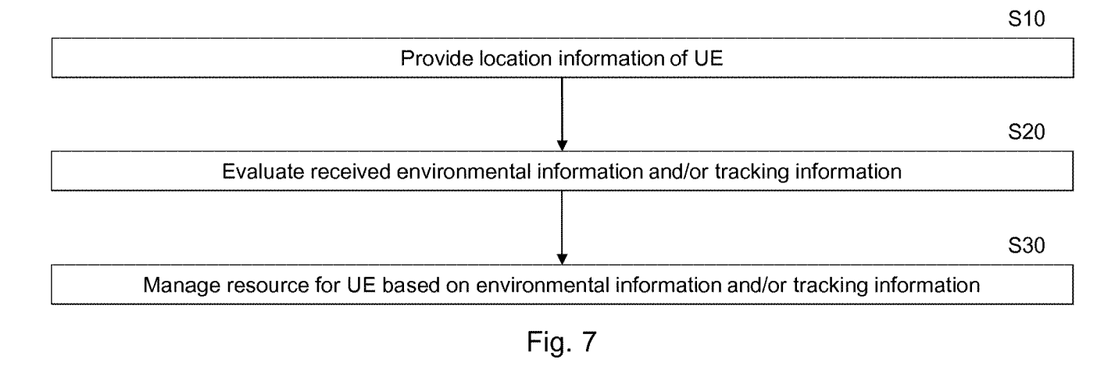
FIG. 7 shows a method according to an embodiment of the invention.

FIG. 6 shows an apparatus according to an embodiment of the invention. The apparatus may be a wireless network such as a RAN (represented by a gNB, or eNB etc.), a core (represented e.g. by a MME), a MEC, or an element thereof. FIG. 7 shows a method according to an embodiment of the invention. The apparatus according to FIG. 6 may perform the method of FIG. 7 but is not limited to this method. The method of FIG. 7 may be performed by the apparatus of FIG. 6 but is not limited to being performed by this apparatus.

The apparatus comprises means for providing 10, means for evaluating 20, and means for managing 30. Each of the means for providing 10, means for evaluating 20, and means for managing 30 may be a providing means, evaluating means, and managing means, respectively. Each of the means for providing 10, means for evaluating 20, and means for managing 30 may be a provider, evaluator, and manager, respectively. Each of the means for providing 10, means for evaluating 20, and means for managing 30 may be a providing processor, evaluating processor, and managing processor, respectively.

The means for providing 10 provides location information to a radio-independent localization and tracking system (S10). The location information indicates a location of a terminal (e.g. UE). Typically, the means for providing 10 provides an identifier of the terminal along with the location information.

The means for evaluating 20 evaluates at least one of environmental information and tracking information (S20). The at least one of the environmental information and the tracking information is received from the radio-independent localization and tracking system with respect to the terminal. It is received in response to providing the location information. "Receiving in response" does not necessarily mean that the at least one of the environmental information and the tracking information is received immediately after the location information was provided. It means that the at least one of the environmental information and the tracking information refers back to the providing message of S10, e.g. by reference to the identifier of the terminal, if such identifier is provided. The environmental information comprises information about an environment of the terminal, and the tracking information comprises information about a track of the terminal.

The means for managing 30 manages a resource for serving the terminal based on the at least one of the environmental information and the tracking information (S30). The resource may be a resource of the radio network or of the core network or a combination thereof.

Figure 8:
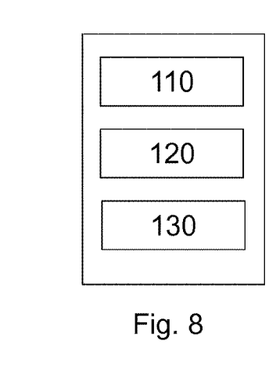
FIG. 8 shows an apparatus according to an embodiment of the invention.
Figure 9:
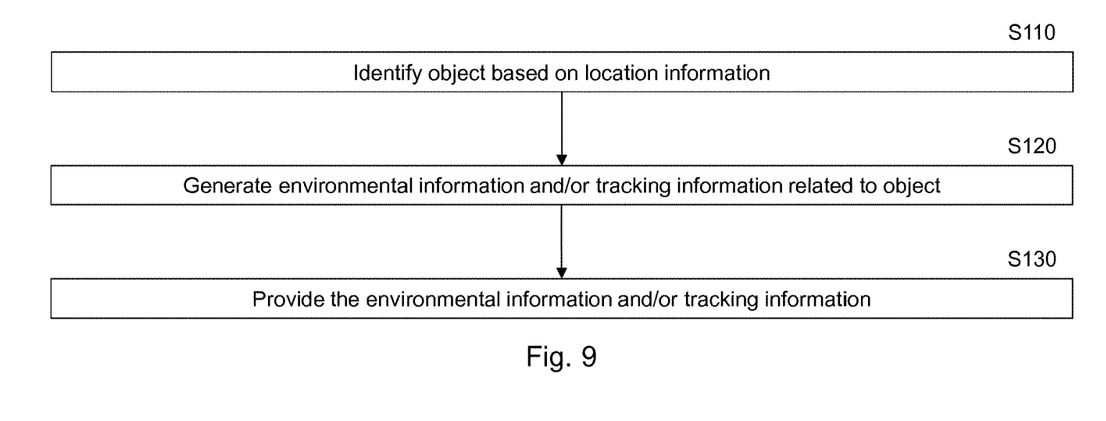
FIG. 9 shows a method according to an embodiment of the invention.

FIG. 8 shows an apparatus according to an embodiment of the invention. The apparatus may be a computer vision system or an element thereof. FIG. 9 shows a method according to an embodiment of the invention. The apparatus according to FIG. 8 may perform the method of FIG. 9 but is not limited to this method. The method of FIG. 9 may be performed by the apparatus of FIG. 8 but is not limited to being performed by this apparatus.

The apparatus comprises means for identifying 110, means for generating 120, and means for providing 130. Each of the means for identifying 110, means for generating 120, and means for providing 130 may be an identifying means, generating means, and providing means, respectively. Each of the means for identifying 110, means for generating 120, and means for providing 130 may be an identifier, generator, and provider, respectively. Each of the means for identifying 110, means for generating 120, and means for providing 130 may be an identifying processor, generating processor, and providing processor, respectively.

The means for identifying 110 identifies an object in a first representation of an environment (e.g. a first image) of an object based on location information (S110). The location information indicates a location, It is received from a wireless network.

The means for generating 120 generates at least one of environmental information and tracking information of the object from a second representation of the environment (e.g. a second image) (S120). The second representation of the environment may be the same representation of the environment as the first representation of the environment, or the second representation of the environment may be different from the first representation of the environment. The means for generating may use one, two, or more than two representations of the environment. The environmental information comprises information about the environment of the object, and the tracking information comprises information about a track of the object.

The means for providing 130 provides the at least one of the environmental information and the tracking information to the wireless network (S130). In particular, the means for providing 130 provides the at least one of the environmental information and the tracking information in response to receiving the location information. "Providing in response" does not necessarily mean that the at least one of the environmental information and the tracking information is provided immediately after the location information was received. It means that the at least one of the environmental information and the tracking information refers back to the providing message of S110 comprising the location information, e.g. by reference to an identifier of a terminal, if such identifier is provided.

Figure 10:
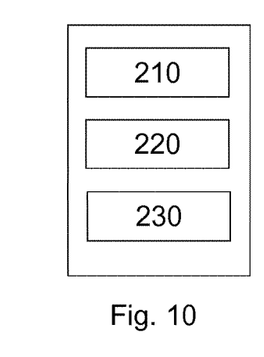
FIG. 10 shows an apparatus according to an embodiment of the invention.
Figure 11:
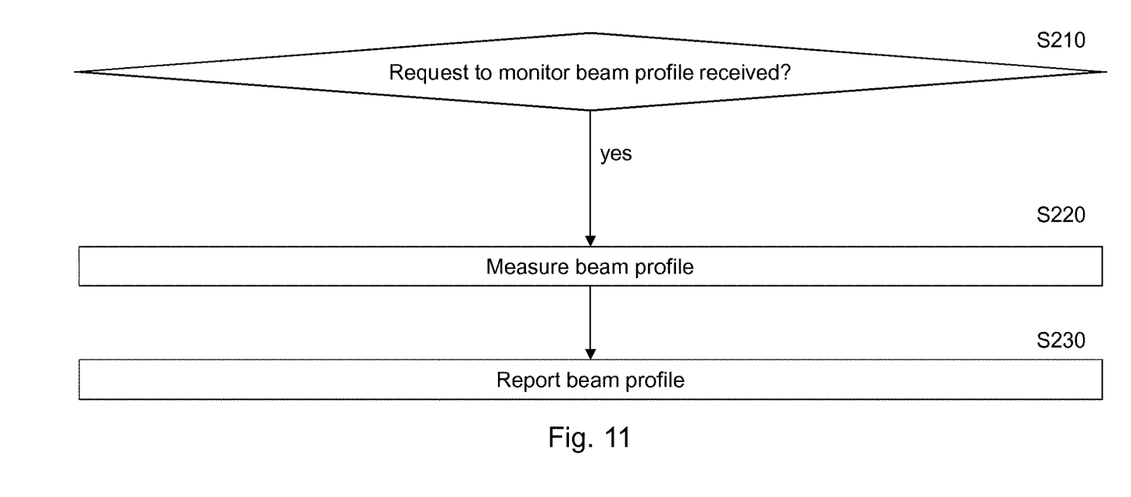
FIG. 11 shows a method according to an embodiment of the invention.

FIG. 10 shows an apparatus according to an embodiment of the invention. The apparatus may be a terminal (such as a UE) or an element thereof. FIG. 11 shows a method according to an embodiment of the invention. The apparatus according to FIG. 10 may perform the method of FIG. 11 but is not limited to this method. The method of FIG. 11 may be performed by the apparatus of FIG. 10 but is not limited to being performed by this apparatus.

The apparatus comprises means for monitoring 210, means for controlling 220, and means for reporting 230. Each of the means for monitoring 210, means for controlling 220, and means for reporting 230 may be a monitoring means, controlling means, and reporting means, respectively. Each of the means for monitoring 210, means for controlling 220, and means for reporting 230 may be a monitor, controller, and reporter, respectively. Each of the means for monitoring 210, means for controlling 220, and means for reporting 230 may be a monitoring processor, controlling processor, and reporting processor, respectively.

The means for monitoring 210 monitors if a request to measure a beam profile of a downlink receive beam is received (S210).

If the request is received (S210=yes), the means for controlling 220 controls a means for setting and a means for measuring such that the beam profile is measured (S220). Namely, it controls the means for setting such that the means for setting sets a direction of the downlink receive beam to at least two different directions; and it controls the means for measuring such that it measures a respective channel state information for each of the at least two different directions.

The means for reporting 230 reports the respective channel state information for each of the at least two different directions (S230).

Figure 12:
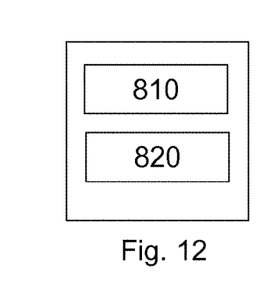
FIG. 12 shows an apparatus according to an embodiment of the invention.

FIG. 12 shows an apparatus according to an embodiment of the invention. The apparatus comprises at least one processor 810, at least one memory 820 including computer program code, and the at least one processor 810, with the at least one memory 820 and the computer program code, being arranged to cause the apparatus to at least perform at least one of the methods according to FIGS. 7, 9, and 11.

Embodiments of the invention are described for 3GPP networks such as 3G networks, 4G networks, 5G networks. However, the invention is not restricted to 3GPP networks and may be employed in other wireless networks, too.

A UE is an example of a terminal. However, the terminal may be any device capable to connect to the (3GPP) radio network such as a MTC device, a IoT device etc. The invention is described substantially for UEs in RRC connected state. However, the invention is not limited to such UEs. It may be applied to UEs in RRC inactive stat or in idle mode, too, if corresponding signalling is defined.

A gNB is an example of a base station. However, the base station may be any device capable to provide a base station function in the respective radio network, such as a eNB or a NodeB.

The invention is described with a focus on allocating and/or optimizing radio resources for the terminal. However, the invention is not limited to radio resources. It may be used for allocating and/or optimizing core resources, too. For example, based on the tracking information from the CV system, core may decide whether or not an inter-MME handover is preferred.

The position of the UE may be determined by CN based LMF or RAN based LMC or a combination of both. Typically, LMF and/or LMC are able to control the UE based or UE assisted positioning procedures. The positioning method may be selected based on the UE capability and/or network support, e.g. the method is not limited to OTDOA, for example.

The invention is described with respect to a RGB camera. However, another camera for obtaining a visual image may be used instead of the RGB camera.

The invention is not limited to visual images and CV systems. For example, the invention may be applied to infrared images, too. The invention is not even limited to images obtained by electromagnetic radiation. For example, it may be applied to signals from ultrasonic reflection (echoes), too. The invention may be applied to an arbitrary combination of such images and signals. Each of these images and signals may be a representation of the environment of the object. A CV system is a particular kind of a radio-independent localization and tracking system. Here "radio-independent" means independent from the information derivable from the radio measurements in the wireless network.

One piece of information may be transmitted in one or plural messages from one entity to another entity. Each of these messages may comprise further (different) pieces of information.

Names of network elements, protocols, and methods are based on current standards. In other versions or other technologies, the names of these network elements and/or protocols and/or methods may be different, as long as they provide a corresponding functionality.

If not otherwise stated or otherwise made clear from the context, the statement that two entities are different means that they perform different functions. It does not necessarily mean that they are based on different hardware. That is, each of the entities described in the present description may be based on a different hardware, or some or all of the entities may be based on the same hardware. It does not necessarily mean that they are based on different software. That is, each of the entities described in the present description may be based on different software, or some or all of the entities may be based on the same software. Each of the entities described in the present description may be embodied in the cloud.

According to the above description, it should thus be apparent that example embodiments of the present invention provide, for example, a wireless network represented by a base station such as a gNB or eNB or by a MEC, or a component thereof, an apparatus embodying the same, a method for controlling and/or operating the same, and computer program(s) controlling and/or operating the same as well as mediums carrying such computer program(s) and forming computer program product(s). According to the above description, it should thus be apparent that example embodiments of the present invention provide, for example, a computer vision system, or a component thereof, an apparatus embodying the same, a method for controlling and/or operating the same, and computer program(s) controlling and/or operating the same as well as mediums carrying such computer program(s) and forming computer program product(s). According to the above description, it should thus be apparent that example embodiments of the present invention provide, for example, a terminal such as a UE, or a component thereof, an apparatus embodying the same, a method for controlling and/or operating the same, and computer program(s) controlling and/or operating the same as well as mediums carrying such computer program(s) and forming computer program product(s).

Implementations of any of the above described blocks, apparatuses, systems, techniques or methods include, as non-limiting examples, implementations as hardware, software, firmware, special purpose circuits or logic, general purpose hardware or controller or other computing devices, or some combination thereof.

It is to be understood that what is described above is what is presently considered the preferred embodiments of the present invention. However, it should be noted that the description of the preferred embodiments is given by way of example only and that various modifications may be made without departing from the scope of the invention as defined by the appended claims.

The invention claimed is:

1. Wireless network apparatus, comprising:
   at least one processor; and
   at least one non-transitory memory including computer program code,
   the at least one memory and the computer program code configured to, with the at least one processor, cause the wireless network apparatus to:
   provide location information indicating a location of a terminal to a radio-independent localization and computer vision tracking system, wherein the location information includes: angular information regarding beams serving one or more radio resource control (RRC) connected devices and spatial coordinates of one or more RRC-connected devices obtained directly from the device via a radio-independent localization method including global navigation satellite system (GNSS), wherein the angular information including azimuth, elevation, and 3 dB beamwidth;
   receive at least one of environmental information and tracking information from the radio-independent localization and computer vision tracking system in response to providing the location information, wherein the environmental information and tracking information is captured by the radio-independent localization and computer vision tracking system via computer vision;
   evaluate the received at least one of environmental information and tracking information;
   obtain constraint information indicating a constraint of the radio-independent localization and computer vision tracking system for generating any tracking information, wherein the constraint information comprises an indication of a space monitored by the radio-independent localization and computer vision tracking system;
   check, based on the constraint information, when the radio-independent localization and computer vision tracking system is capable to obtain the at least one of the environmental information or the tracking information with respect to the terminal;
   inhibit the providing from providing the location information of the terminal to the radio-independent localization and computer vision tracking system when the radio-independent localization and computer vision tracking system is not capable to obtain the at least one of the environmental information or the tracking information with respect to the terminal;
   manage a resource for serving the terminal based on the at least one of the environmental information and the tracking information, wherein the environmental information comprises information about an environment of the terminal, and the tracking information comprises information about a track of the terminal;
   monitor when a predefined event related to the terminal occurs, wherein the predefined event comprises at least one of a request for a handover of the terminal or a request for a beam reselection of the terminal;
   request the environmental information and the tracking information from the radio-independent localization and computer vision tracking system when the predefined event occurs;
   supervise when the environmental information and the tracking information is received from the radio-independent localization and computer vision tracking system;
   trigger the evaluating to evaluate the environmental information and the tracking information when the at least one of the environmental information and the tracking information is received; and
   determine the location of the terminal based on at least one of an evaluation of a radio measurement and an evaluation of a satellite measurement, wherein the radio measurement comprises a measurement of a profile of a downlink receive beam received from the terminal.

* * * * *